United States Patent
Winzell

(10) Patent No.: US 10,789,688 B2
(45) Date of Patent: Sep. 29, 2020

(54) METHOD, DEVICE, AND SYSTEM FOR ENHANCING CHANGES IN AN IMAGE CAPTURED BY A THERMAL CAMERA

(71) Applicant: Axis AB, Lund (SE)

(72) Inventor: Thomas Winzell, Lund (SE)

(73) Assignee: AXIS AB, Lund (SE)

(*) Notice: Subject to any disclaimer, the term of this patent is extended or adjusted under 35 U.S.C. 154(b) by 0 days.

(21) Appl. No.: 16/687,704

(22) Filed: Nov. 19, 2019

(65) Prior Publication Data

US 2020/0193574 A1   Jun. 18, 2020

(30) Foreign Application Priority Data

Dec. 18, 2018  (EP) ..................... 18213427

(51) Int. Cl.
  *H04N 5/235*    (2006.01)
  *H04N 5/57*    (2006.01)
  (Continued)

(52) U.S. Cl.
  CPC ............... *G06T 5/009* (2013.01); *G06T 5/50* (2013.01); *G06T 7/0002* (2013.01);
  (Continued)

(58) Field of Classification Search
  CPC .......... H04N 5/33; H04N 5/2351; H04N 5/32; H04N 5/30; H04N 5/208; H04N 5/57;
  (Continued)

(56) References Cited

U.S. PATENT DOCUMENTS

2008/0298685 A1  12/2008  Maeda
2014/0340427 A1*  11/2014  Baker ............... H04N 9/3185
                                                345/641
(Continued)

FOREIGN PATENT DOCUMENTS

EP    0983683 B1    11/2006
EP    3016383 A2    5/2016
(Continued)

OTHER PUBLICATIONS

Maragatham, G., et al., "Contrast Enhancement by object based Histogram Equalization," 2011 World Congress on Information and Communication Technologies, IEEE, Dec. 11-14, 2011, pp. 1118-1122.
(Continued)

*Primary Examiner* — Sherrie Hsia
(74) *Attorney, Agent, or Firm* — Xsensus LLP

(57) ABSTRACT

There is provided a method, a device (104), and a system (100) for enhancing changes in an image (103a) of an image sequence (103) captured by a thermal camera (102). An image (103a) which is part of the image sequence (103) is received (S02) and pixels (408) in the image that have changed in relation to another image (103b) in the sequence are identified (S04). Based on the intensity values of the identified pixels, a function (212, 212a, 212b, 212c, 212d, 212e) which is used to redistribute intensity values of changed as well as non-changed pixels in the image is determined (S06). The function has a maximum (601) for a first intensity value (602) in a range (514) of the intensity values of the identified pixels, and decays with increasing distance from the first intensity value.

15 Claims, 4 Drawing Sheets

(51) Int. Cl.
*G06T 5/00* (2006.01)
*G06T 5/50* (2006.01)
*G06T 7/00* (2017.01)

(52) U.S. Cl.
CPC . *H04N 5/2351* (2013.01); *G06T 2207/10016* (2013.01); *G06T 2207/10048* (2013.01); *G06T 2207/30168* (2013.01); *G06T 2207/30232* (2013.01)

(58) Field of Classification Search
CPC .......... H04N 5/16; H04N 5/165; H04N 5/332; H04N 5/361; H04N 5/367; H04N 5/147; H04N 5/144; H04N 9/045; G06T 2207/10016; G06T 7/0002; G06T 2207/10048; G06T 2207/30168; G06T 2207/30232; G06T 5/00; G06T 5/001; G06T 5/009; G06T 5/50
USPC ....... 348/164, 162, 241, 251, 246, 248, 252, 348/257, 625, 687, 690, 691, 700, 701; 382/254, 266, 274, 275
See application file for complete search history.

(56) References Cited

U.S. PATENT DOCUMENTS

| | | |
|---|---|---|
| 2015/0009355 A1 | 1/2015 | Peng |
| 2016/0125618 A1 | 5/2016 | Johansson et al. |
| 2016/0212355 A1 | 7/2016 | Pouli et al. |

FOREIGN PATENT DOCUMENTS

| | | |
|---|---|---|
| EP | 3142355 A1 | 3/2017 |
| WO | 2014/100787 A1 | 6/2014 |

OTHER PUBLICATIONS

Dias, U., and Rane, M., "Motion Based Object Detection and Classification for Night Surveillance," Ictact Journal on Image and Video Processing, vol. 3, No. 2, Nov. 2012, pp. 518-521.

\* cited by examiner

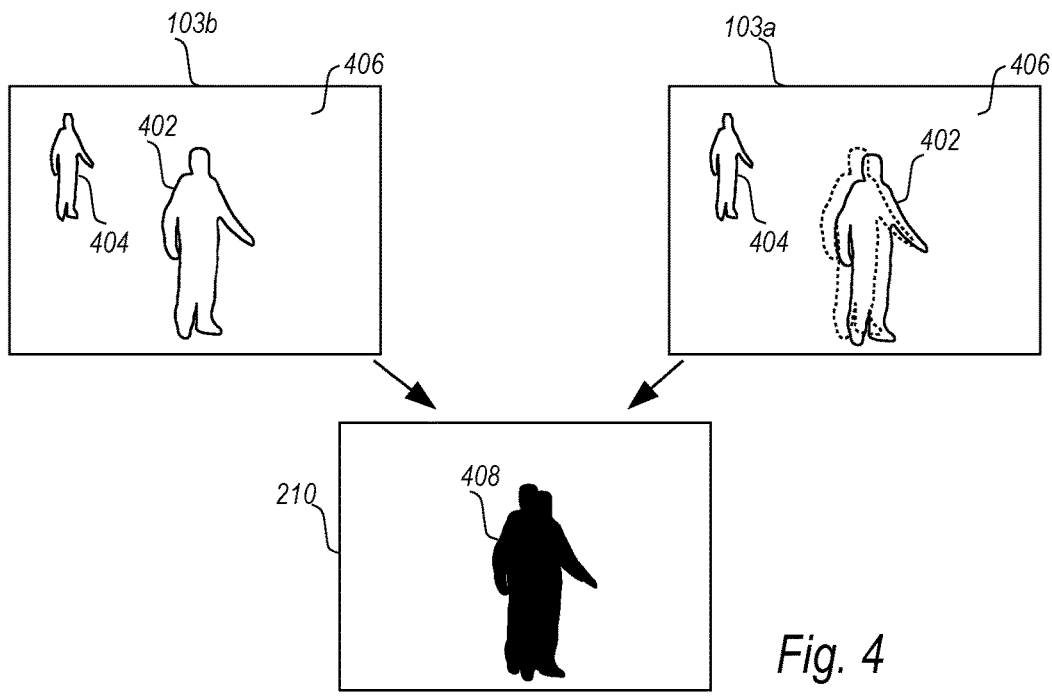
Fig. 4
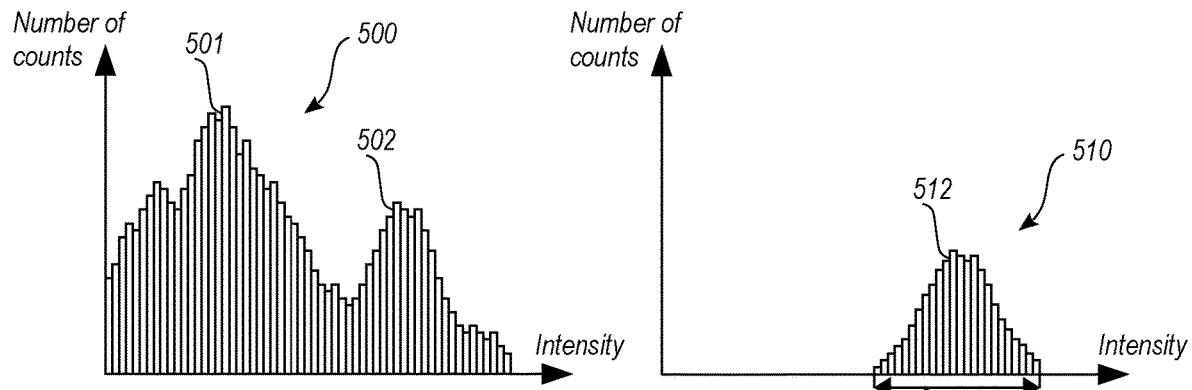
Fig. 5a
Fig. 5b
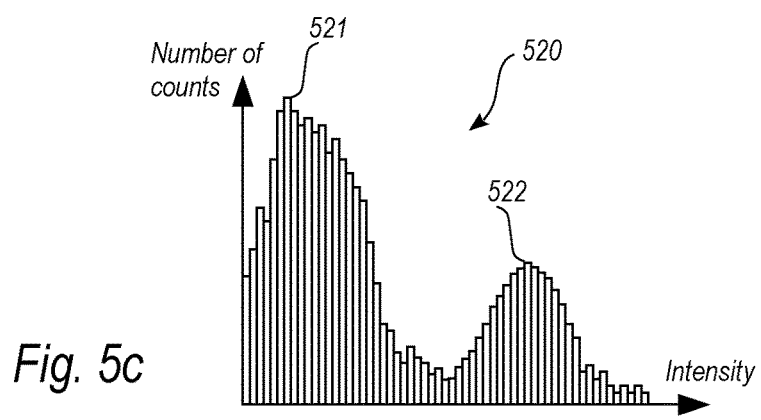
Fig. 5c

METHOD, DEVICE, AND SYSTEM FOR ENHANCING CHANGES IN AN IMAGE CAPTURED BY A THERMAL CAMERA

CROSS-REFERENCE TO RELATED APPLICATION

The present application claims priority to EP 18213427.0, filed Dec. 18, 2018, the entire contents of which are incorporated herein by reference.

TECHNICAL FIELD

The present invention relates to the field of processing thermal images. Specifically, it relates to a method, a device, and a system for enhancing changes in an image of an image sequence captured by a thermal camera.

BACKGROUND

Thermal cameras are nowadays often used for surveillance purposes. Thermal cameras are great detectors which can be used to both detect and classify objects at long distances and under difficult circumstances, often much better than a visual light camera. However, due to a generally lower resolution of thermal cameras compared to visual light cameras, this detection potential is hard to utilize in automatic systems such as automated motion detection systems. Because of the lower resolution, a small or distant object in the scene may only cover one or a few pixels of the captured thermal images. When motion in the scene is detected from the thermal images, the small or distant object may therefore easily be mistaken for noise instead of being detected as a moving object. In addition, most motion detection engines are optimized for visual camera images and not for thermal camera images.

These problems are recognized in EP3016383 A1. In that document it is proposed to enhance pixels of an image in an image sequence that have changed since the previous image in the image sequence. In that way, a small or distant moving object in the scene will appear as larger in the image. That is, the object will cover an increased amount of pixels in the image. It is therefore less likely to be mistaken for noise and is more likely to be detected as a moving object.

EP3016383 A1 takes the simplistic approach of enhancing the pixels that have changed since the previous frame by gaining or adding an offset to the pixel values. However, in order to further improve the chances of correctly detecting moving objects from a thermal image sequence, there is a need for methods which serve to even further enhance changes in the thermal image sequence.

SUMMARY OF THE INVENTION

In view of the above, it is thus an object of the invention to mitigate the above problems and further improve enhancement of changes in a thermal image sequence.

According to a first aspect, the above object is achieved by a method for enhancing changes in an image of an image sequence captured by a thermal camera. The method comprises:

receiving an image which is part of an image sequence captured by a thermal camera, identifying pixels in the image that have changed in relation to another image in the image sequence by comparing the image to the other image in the image sequence, determining, based on intensity values of the identified pixels, a function for redistributing intensity values of pixels in the image, wherein the function has a maximum for a first intensity value in a range of the intensity values of the identified pixels, and decays with increasing distance from the first intensity value such that the function assigns lower values to intensity values outside of the range than to the first intensity value, and redistributing intensity values of pixels in the image that have changed in relation to the other image and intensity values of pixels in the image that have not changed in relation to the other image by using the determined function, thereby enhancing changes in the image.

With this method, pixels which have changed since another image in the sequence are identified. On basis of intensity values of the identified pixels, a function is determined which later on is used when redistributing intensity values in the image. By doing so, the function may be tailored after the intensity values of the changed pixels in the image such that these intensity values are emphasized in the image in a desired way upon performing the redistribution action.

The function is used to redistribute the intensity values of changed as well as non-changed pixels in the image. In other words, intensity values of both pixels that have changed in relation to the other image and pixels that have not changed in relation to the other image are redistributed. This may include all pixels in the image, or at least a majority of the pixels in the image. Due to its shape, with the maximum within the range of intensity values of the changed pixels and the decay with increasing distance from the maximum, the function serves several purposes. More specifically, it does not only tend to give higher weight to pixel intensities corresponding to those of the changed pixels, but it also tends to suppress pixel intensities which are not within the intensity range of the changed pixels. In that way, the contrast is increased between pixels having intensity values within the intensity range of the changed pixels and pixels having intensity values outside of that intensity range. As a result, moving objects will be easier to distinguish and detect in the enhanced image compared to the original image, for example, by using a motion detector which is subsequently applied in the processing of the image.

By the range of the intensity values of the identified pixels is generally meant the interval of intensity values between the minimum intensity value and the maximum intensity value of the identified pixels.

The function for redistributing intensity values of pixels in the image is a function which maps an intensity value in a pixel to a weighting factor. The function may thus also be considered as a function for weighting intensity values of pixels in the image. The function may be used to redistribute intensity values of all pixels in the image by weighting the intensity value of each pixel in the image by the weighting factor assigned to the intensity value by the function.

By a decay of the function with increasing distance is meant that the function decreases with increasing distance. The decrease may be strict or non-strict. However, since the function assigns lower values to intensity values outside of the range than to the first intensity value which is inside the range, the function strictly decreases with distance at least for a portion of the range of intensity values of the identified pixels.

The rate of decay of the function may be determined based on a variation of the intensity values of the identified pixels, wherein a higher variation gives a lower rate of decay. In this way, the function may be adapted to the variation of the intensity values of the changed pixels. More specifically, one may avoid that the rate of decay becomes too fast in relation to the variation of the intensity values of the identified pixels, since that would cause some of the changed pixels to not be properly enhanced. Conversely, one may avoid that the rate of decay is too slow in relation to the variation of the intensity values of the identified pixels, since that would cause a poor contrast between pixels having intensity values within the intensity range of the changed pixels and pixels having intensity values outside of that intensity range. By way of example, if the intensity values of the identified pixels show up as a narrow peak in a histogram, a faster decaying function may be used compared to if the intensity values of the changed pixels show up as a wider peak in the histogram.

The variation of the intensity values of the identified pixels may be determined based on the width of the range of intensity values of the identified pixels. Alternatively, the variation of the intensity values of the identified pixels may be calculated based on a standard deviation of the intensity values of the identified pixels.

The rate of decay of the function may further be based on a variation of intensity values of pixels in the image that are not identified as having changed in relation to the other image, wherein a higher variation of intensity values of pixels in the image that are not identified as having changed in relation to the other image gives a lower rate of decay. Also in this case, the variation may be calculated based on a width of a range or a standard deviation of the intensity values of the concerned pixels. In this way, not only the variation of the intensity values of the changed pixels is taken into account, but also the variation of the intensity values of the non-changed pixels. For example, the relation between the variations of the intensity values of the non-changed pixels and the changed pixels may be taken into account when setting the rate of decay of the function. If the variation of the intensity values of the non-changed pixels is large in relation to the variation of the changed pixels it may, for instance, be beneficial to have a function with a lower rate of decay. Such a situation may occur when only a few pixels have been identified as having changed in relation to the other image. It has been found that by estimating the variation from those few changed pixels (if even possible), one may arrive at a rate of decay which is too fast to allow for proper enhancement of changes in the image. By taking the variation of also the non-changed pixels into account, one may instead arrive at a function with a lower rate of decay, thereby improving the enhancement of changes in the image.

Different approaches may be taken to select the first intensity value for which the determined function has a maximum.

In one approach, the first intensity value corresponds to a mode of the intensity values of the identified pixels. The mode is the most frequent intensity value of the identified pixels. The mode may be extracted from a histogram of the intensity values.

In another approach, the first intensity value corresponds to a mid-point of the range of intensity values of the identified pixels. This is a simple way of setting the first intensity value that does not require calculation of a histogram.

In yet another approach, the first intensity value corresponds to a mean value of the intensity values of the identified pixels. This also provides a simple way of setting the first intensity value.

Further approaches include the median or the center of gravity of the distribution of the intensity values of the identified pixels.

Which approach to choose in a particular situation may, for example, depend on the shape of the distribution of the intensity values of the identified pixels. For a symmetric shape of the distribution the mean value may do, while for more complicated shapes of the distribution the mode or the mid-point of the range may be preferred. In some cases, the choice may depend on where the intensity values of the identified pixels are located on an intensity scale. For example, if the range of the intensity values of the changed pixels is located at the upper end of the intensity scale, it may be beneficial to set the first intensity value to be at the lower end of the range of intensity values of the changed pixels, and vice versa.

The function may be symmetric around the first intensity value. This may be appropriate if the distribution of the intensity values of the identified pixels is approximately symmetric.

Alternatively, the function may be skewed around the first intensity value. By the function being skewed is meant that one of its tails is heavier than the other tail. A reason of using a skewed function is that it allows for putting more emphasize on intensity values which are higher than the first intensity than on intensity values which are lower than the first intensity, or vice versa.

For example, the function may be skewed to have a heavier tail for higher intensity values than for lower intensity values. This may, for instance, be used in an application dealing with detecting human beings or animals in an environment which is colder than the body temperature of the human or the animal. Having a heavier tail for higher intensity values would then allow for putting more emphasize on intensity values associated with the human beings compared to the background.

In the reverse situation where human beings or animals in a warmer environment are to be detected, the heavier tail may instead be located for the lower intensity values.

In practice, a temperature sensor, e.g., located in the thermal camera could be used to determine the ambient temperature and the side of the skewness may be determined on basis of the measured ambient temperature. If the ambient temperature is lower than a typical temperature of the objects of interest, the skewness of the function may be set to have a heavier tail for higher intensity values than for lower intensity values, and vice versa. Ambient temperature may be measured using a thermal detector of bolometer type in the thermal camera.

The function may be a parametric function. For example, the function may be a Gaussian function (in a symmetric case) or a skewed Gaussian function (in a non-symmetric case). This is advantageous in that the function easily may be determined from a few parameters which are extracted from the intensity values of the identified pixels.

The step of identifying pixels in the image that have changed in relation to another image in the image sequence may include identifying pixels in the image that have an intensity value which differs by more than a threshold value from an intensity value of a corresponding pixel of the other image in the image sequence. By applying a threshold, small and insignificant changes (such as noise) may be excluded.

According to a second aspect, there is provided a device for enhancing changes in an image of an image sequence captured by a thermal camera, comprising:

a receiver configured to receive an image which is part of an image sequence captured by a thermal camera, a change detector configured to identify pixels in the image that have changed in relation to another image in the image sequence by comparing the image to the other image in the sequence, a redistribution function determiner configured to determine, based on intensity values of the identified pixels, a function for redistributing intensity values of pixels in the image, wherein the function has a maximum for a first intensity value in a range of the intensity values of the identified pixels, and decays with increasing distance from the first intensity value such that the function assigns lower values to intensity values outside of the range than to the first intensity value, and an intensity value redistributor configured to redistribute intensity values of pixels in the image that have changed in relation to the other image and intensity values of pixels in the image that have not changed in relation to the other image by using the determined function, thereby enhancing changes in the image.

According to a third aspect, there is provided a system for enhancing changes in an image of an image sequence captured by a thermal camera, comprising:

a thermal camera configured to capture an image sequence, a device according to the second aspect arranged to receive images of the image sequence captured by the thermal camera.

According to a fourth aspect, there is provided a computer-readable storage medium having computer code instructions stored thereon which, when executed by a processor, causes the processor to carry out the method of the first aspect. The computer-readable storage medium may be a non-transitory computer-readable storage medium.

The second, third, and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein:

FIG. 4 schematically illustrates how to identify pixels in a current image that have changed in relation to another image according to embodiments.

FIG. 5a shows an example of a histogram of intensity values of a current image.

FIG. 5b shows an example of a histogram of intensity values of a current image that have changed in relation to another image.

FIG. 5c shows an example of a histogram of intensity values of an image in which changes have been enhanced.

DETAILED DESCRIPTION OF EMBODIMENTS

The present invention will now be described more fully hereinafter with reference to the accompanying drawings, in which embodiments of the invention are shown.

Figure 1:
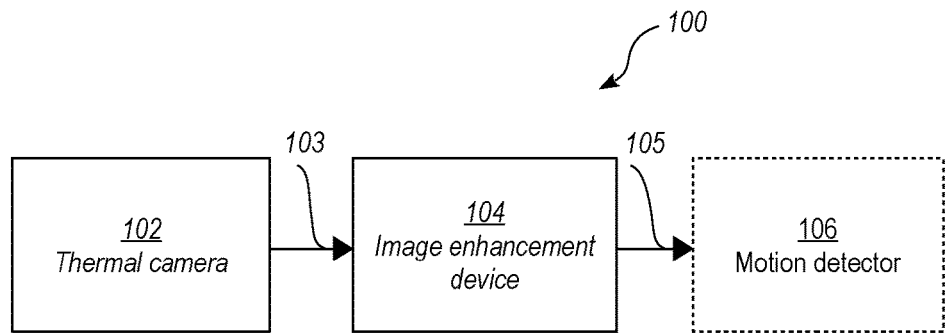
FIG. 1 schematically illustrates a system for enhancing changes in an image sequence captured by a thermal camera according to embodiments.

FIG. 1 illustrates a system 100. The system 100 may be used for enhancing changes in an image of an image sequence captured by a thermal camera 102. The system 100 comprises the thermal camera 102 and an image enhancement device 104. The system 100 may also comprise a motion detector 106. The image enhancement device 104 may be an integral part of the thermal camera 102. For example, the image enhancement device 104 may be integrated in an image processing pipeline of the thermal camera 102. As such, it does not need to be an isolated component of the thermal camera, but it may share components, for instance a processor, with other parts of the thermal camera. Alternatively, and as shown in FIG. 1, the image enhancement device 104 may be provided separately from the thermal camera 102.

The system 100 may be used for monitoring or surveillance purposes. The thermal camera may hence be a monitoring camera. The system 100 may, for example, be used for motion detection in scenes which are static most of the time, such as for perimeter surveillance. When used for such purposes, the system 100 serves to improve the performance of the motion detection by enhancing changes in the images, thereby making them more visible and easier to detect for the motion detector 106.

The thermal camera 102 utilizes a thermal sensor to visualize heat differences within the scene. As is known in the art, a thermal sensor detects thermal energy emitted by objects in the scene and converts the detected thermal energy into electric signals to produce a thermal image or a thermal video, i.e., a sequence of thermal images 103. The intensity values of the pixels of the so produced images are thus indicative of the thermal energy emitted by the objects in the scene, which in turn depends on the temperature of the emitting objects. The thermal camera 102 may hence provide a sequence of thermal images 103 in which a warm object, such as a human being, or an animal, stands out against a surrounding, cooler, background, or vice versa. Examples of other objects for which the invention may be used are motorized vehicles of different types, such as cars or drones. By way of example, FIG. 5a schematically illustrates a histogram 500 of intensity values of a thermal image which depicts human beings in a cooler background. The human beings show up as a peak 502 in the histogram 500.

The system 100 is capable of enhancing changes in images of the image sequence 103 regardless of whether the thermal camera 102 is absolutely calibrated or not. For an absolutely calibrated thermal camera the intensity values of the thermal images 103 are calibrated with respect to the temperature scale. This implies that temperatures may directly be read out from the intensity values of the thermal images 103.

The thermal camera 102 is arranged to provide the sequence of thermal images 103 to the image enhancement device 104. In case the image enhancement device 104 is separate from the thermal camera 102, the sequence of thermal images 103 may be transmitted from the thermal camera 102 to the device 104 via a cable or wirelessly over a network. The image enhancement device 104, in turn, processes images of the sequence 103 to produce an enhanced sequence of images 105 in which changes in the images are enhanced. As a result of the processing, changes in the images will be enhanced so as to stand out more clearly from the surrounding background. For example, the processing causes an increase in contrast between changed pixels and the background in the image. The image enhancement device 104 may be located early in the processing chain or pipeline of the thermal camera 102. In some embodiments, the image enhancement device 104 even operates on image raw data. Early in the processing chain the image data is typically represented at a high resolution, such as at a high spatial resolution and/or a high bit resolution (more bits per pixel). Later on in the processing chain (such as prior to motion detection), the resolution of the image data may be down scaled, e.g., by reducing the spatial resolution and/or the bit resolution. By enhancing changes at an early stage, at the higher resolution, also changes that otherwise would be lost by the down scaling may be detected and enhanced. In that way, the enhancement of the changes has a higher impact if it is made early in the processing chain.

In some cases, this may be utilized to improve the detection of moving objects in the sequence of images 103 captured by the thermal camera 102. In more detail, the enhanced sequence of images 105 may be input to a motion detector 106. The motion detector 106 may be a standard, commercially available, motion detector which implements a known motion detection algorithm. The motion detector 106 need not be specifically adapted to process thermal images. Rather, as is often the case, the motion detector 106 may be designed to detect motion in images captured by visual light cameras. Since changes in the images are enhanced in the enhanced image sequence 105, they are easier to detect for the motion detector 106 compared to if the original image sequence 103 instead had been provided at its input. For example, and as described above, the chances are improved of detecting small or distant moving objects in the scene that only cover one or a few pixels in the thermal images. The processing carried out by the image enhancement device 104 may hence in some cases be seen as a pre-processing of the sequence of thermal images 103 prior to motion detection.

In other cases, the enhancement of changes in the image may be utilized to improve the identification of moving objects in the sequence of images 103, such as by performing shape detection. The system 100 may therefore include a shape detector instead of, or in addition, to the motion detector 106. By using a shape detector, it is possible to not only detect motion, but also to identify what kind of object is moving.

Figure 2:
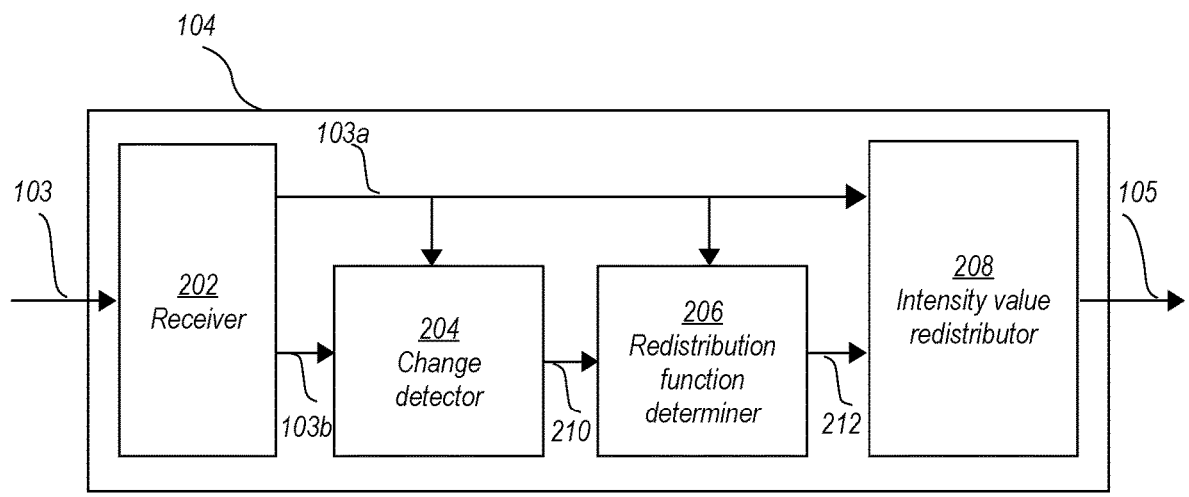
FIG. 2 schematically illustrates a device for enhancing changes in an image sequence captured by a thermal camera according to embodiments.

FIG. 2 illustrates the image enhancement device 104 in more detail. The image enhancement device 104 comprises a receiver 202, a change detector 204, a redistribution function determiner 206, and an intensity value redistributor 208.

The image enhancement device 104 thus comprises various components 202, 204, 206, 208 which are configured to implement the functionality of the device 104. In particular, each illustrated component corresponds to a functionality of the device 104. Generally, the device 104 may comprise circuitry which is configured to implement the components 202, 204, 206, 208 and, more specifically, their functionality.

In a hardware implementation, each of the components 202, 204, 206, 208 may correspond to circuitry which is dedicated and specifically designed to provide the functionality of the component. The circuitry may be in the form of one or more integrated circuits, such as one or more application specific integrated circuits or one or more field-programmable gate arrays. By way of example, the change detector 204 may thus comprise circuitry which, when in use, identifies pixels in the image that have changed in relation to another image in the image sequence.

In a software implementation, the circuitry may instead be in the form of a processor, such as a microprocessor, which in association with computer code instructions stored on a (non-transitory) computer-readable medium, such as a non-volatile memory, causes the device 104 to carry out any method disclosed herein. Examples of non-volatile memory include read-only memory, flash memory, ferroelectric RAM, magnetic computer storage devices, optical discs, and the like. In a software case, the components 202, 204, 206, 208 may thus each correspond to a portion of computer code instructions stored on the computer-readable medium, that, when executed by the processor, causes the device 104 to carry out the functionality of the component.

It is to be understood that it is also possible to have a combination of a hardware and a software implementation, meaning that the functionality of some of the components 202, 204, 206, 208 are implemented in hardware and others in software.

The operation of the image enhancement device 104 when enhancing changes in an image of the image sequence 103 captured by the thermal camera 102 will now be described with reference to FIGS. 1, 2, and the flow chart of FIG. 3.

Figure 3:
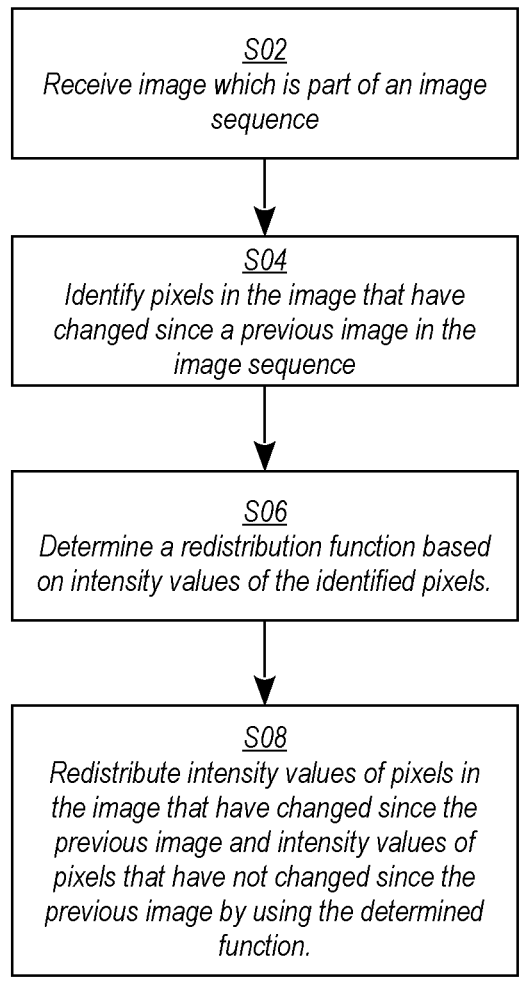
FIG. 3 is a flow chart of a method for enhancing changes in an image sequence captured by a thermal camera according to embodiments.

In step S02 of FIG. 3, the receiver 202 of the image enhancement device 104 receives the image sequence 103 captured by the thermal camera 102. The images of the sequence 103 may be received sequentially as they are captured by the thermal camera 102. Specifically, the receiver 202 receives a current image 103a which is about to be enhanced, and another image 103b of the sequence 103. The other image 103b may be previous to the current image 103a in the image sequence 103, or it may be later than the current image 103a in the image sequence 103. The other image 103b may be adjacent to the current image 103a in the sequence 103. For example, it may be the immediately preceding image to the current image 103a in the sequence 103. However, it may in principle be any earlier or later image in the sequence 103.

To exemplify, FIG. 4 illustrates a current 103a and a previous 103b image in the sequence 103. Each of the previous image 103b and the current image 103a depicts a first object 402, a second object 404, and background 406. In the example, the objects 402, 404 are illustrated as human beings. The first object 402 has moved between the previous frame 103b and the current frame 103a, while the second object 404 is stationary. To illustrate this fact, the position of the first object 402 in the previous frame 103b is indicated in the current image 103a by means of dashed lines.

The current image 103a and the other image 103b are input to the change detector 204. In step S04, the change detector 204 identifies pixels in the image 103a that have changed in relation to the other image 103b. For that purpose, the change detector 204 may compare the current image 103a to the other image 103b pixel by pixel to see which pixels have changed. In that way, changes in the image 103a may quickly be identified. To determine which pixels have changed, the change detector 204 may apply a threshold. Pixels having an intensity value which has changed by more than the threshold since the previous frame may be identified as pixels that have changed. The other pixels are identified as pixels that have not changed. The value of the threshold may be set depending on the variability of the noise at the thermal sensor. Specifically, for thermal cameras, the threshold may be related to the Noise Equivalent Temperature Difference, NETD, which is a signal-to-noise ratio for thermal cameras. For example, a threshold which is equal to twice the standard deviation of the sensor noise may be used. In that way, most of the changes in the image 103a identified by the change detector 204 will correspond to changes in the scene rather than being a result of noise.

Alternatively, or additionally, the change detector 204 may remove isolated pixels or small groups of contiguous pixels from the set of identified pixels. For example, the change detector 204 may remove groups of pixels from the set of identified pixels if the number of contiguous pixels in the groups is smaller than a threshold. In that way, the set of identified pixels only includes groups of contiguous pixels where the number of contiguous pixels in each group is larger than or equal to the threshold.

The change detector 204 may also compare more than two images, such as three images. Pixels which have changed between each pair of consecutive images may be identified as changed pixels.

The change detector 204 may send an indication 210 of which pixels in the current image 103a that have changed in relation to the other image 103b to the redistribution function determiner 206. The indication may, for example, be in the form of a mask which takes one value (such as the value "1") for pixels which are found to have changed, and another value (such as the value "0") for pixels which are not found to have changed.

Returning to the example of FIG. 4, the change detector 204 would in step S04 find that the pixels in the current image 103a that correspond to the first object 402 when positioned as in the current image 103a or as in the previous image 103b have changed. The change detector 204 would further find that the pixels in the current image 103a that correspond to the second object 404 or the background 406 have not changed, since the second object 404 as well as the background is stationary. Based on its findings, and as shown in FIG. 4, the change detector 204 may produce an indication 210 of which pixels 408 have changed since the previous image. The changed pixels 408 are illustrated by black in FIG. 4. The example of FIG. 4 is simplified to illustrate the principles of the invention. In a real-world situation, not all pixels inside of the first object 402 would be identified as having changed since many of the pixels inside of the object 402 have essentially the same temperature and the value of a pixel inside of the object would therefore be essentially the same even if the object has moved. However, most pixels at the boundaries of the object 402 would be identified as having changed since these pixels represent the change from background pixels to object pixels, and vice versa.

In the above example, the change detector 204 identified all pixels in the current image 103a that had changed by more than a threshold value in relation to the other image 103b as changing pixels. In other embodiments, the change detector 204 may also take the direction of change into account. For example, the change detector 204 may only identify pixels in the current image 103a that have increased by more than a threshold value in relation to the other image 103b as changed pixels. This may be relevant when objects which are warmer than the background are of interest. Alternatively, the change detector 204 may only identify pixels in the current image 103b that have decreased by more than a threshold value in relation to the other image 103b as changed pixels. This may be relevant when objects which are cooler than the background are of interest.

It has been found that it is not necessary to take the direction of change (increase or decrease in intensity value) into account when identifying changed pixels. The invention still works satisfactorily in the situation shown in FIG. 4 where all pixels that have changed, regardless of the direction of change, are identified as changed pixels. This may be particularly useful when it is known whether objects which are warmer or cooler than the background are of interest. Some of these changing pixels would, in principle, belong to the background in the current image 103a. However, in reality, there are no sharp contours of the objects due to diffraction. This means that pixels at the contours of the objects will be a mix of background and object pixels. As long as the movement between two frames is in the same order of magnitude as the diffraction (which is typically a few pixels, such as 2-3 pixels, in each direction) it is not necessary to take the direction of change into account when identifying the changed pixels. The changed pixels at the contours of the objects will anyway be a mix of object and background pixels and may be included with good results.

In step S06, the redistribution function determiner 206 proceeds to determine a function 212 which may be used when redistributing intensity values of pixels in the current image 103a. The determination of the function 212 is based on the intensity values of the changed pixels 408 as identified by the change detector 204. In order to do so, the redistribution function determiner 206 may use the indication 210 produced by the change detector 204 to extract the intensity values of the changing pixels 408 from the current image 103a. For example, in case the indication 210 is provided as a mask, this may be performed by a masking procedure.

FIG. 5a schematically illustrates a histogram 500 of the intensity values of all pixels in the current image 103a. The histogram 500 shows how the intensity values of the pixels in the current image 103a are distributed. The histogram 500 has a first peak 501 at a lower part of the intensity scale and a second peak 502 at an upper part of the intensity scale. The first peak 501 is associated with the thermal energy emitted by the background 406 in the scene, and the second peak 502 is associated with the thermal energy emitted by the first object 402 and the second object 404. This is thus an example where the objects 402 and 404 are warmer than the background 406. However, it is understood that there could be situations where it is the other way around, i.e., that the objects are cooler than the background. FIG. 5b illustrates a histogram 510 of the intensity values of the changed pixels 408 of the current image 103a. The histogram 510 shows how the intensity values of the changed pixels 408 in the current image 103a are distributed. In this case, the histogram 510 has a single peak 512 which mostly corresponds to thermal energy emitted by the first, moving, object 402. As can be seen from the histogram 510, the intensity values of the changed pixels 408 take values in a range 514 between a minimum intensity value "Imin" and a maximum intensity value "Imax".

Figure 6:
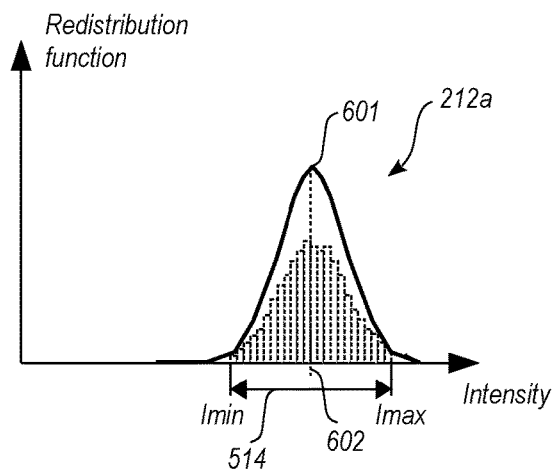
FIG. 6 schematically illustrates various examples of functions which may be used for redistributing intensity values of pixels in an image according to embodiments.
Figure 6:
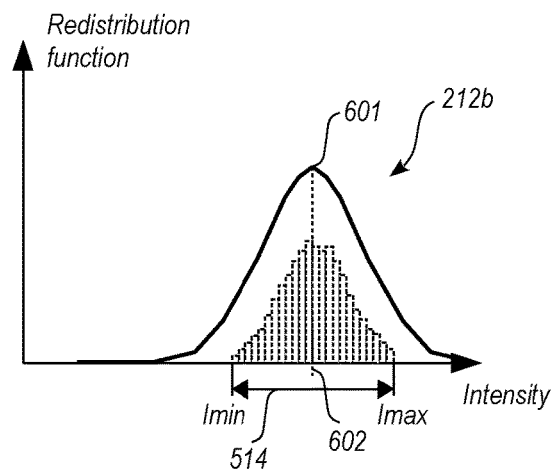
Figure 6:
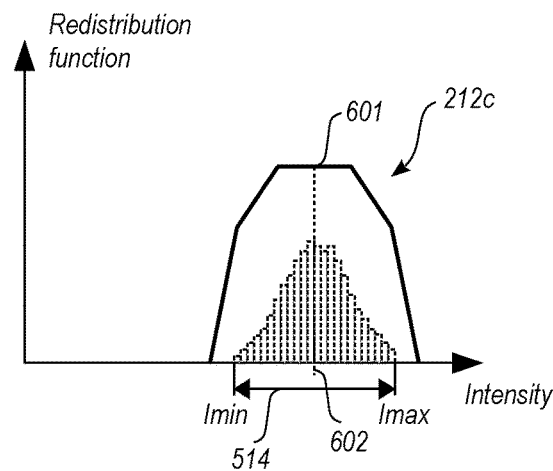
Figure 6:
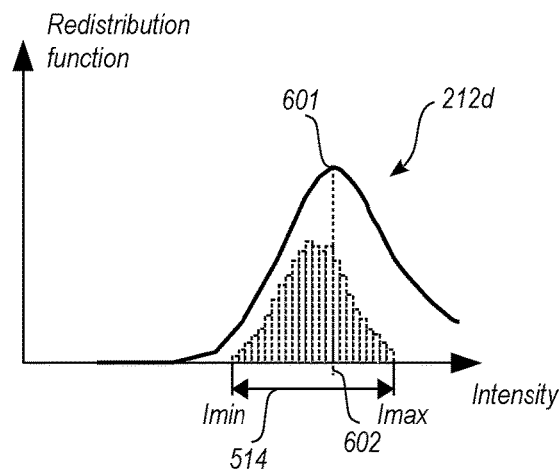
Figure 6:
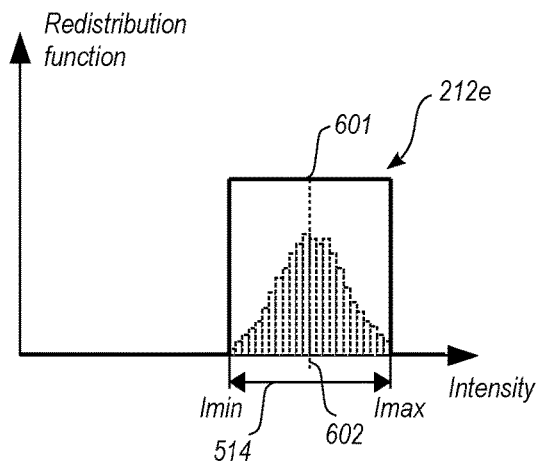

The redistribution function determiner 206 may generally analyse the intensity values of the changed pixels 408, such as the distribution of the intensity values or properties thereof, to determine the function 212. FIG. 6 illustrates what the function 212 may look like by way of five example functions 212a, 212b, 212c, 212d, 212e. The shape of the histogram 510 is also shown in FIG. 6 for reference only. It is not drawn to scale.

The functions 212a, 212b, 212c, 212d, 212e have several characteristics in common. Firstly, they have a maximum 601 for a first intensity value 602 within the range 514 of the intensity values of the changed pixels 408. The maximum 601 may take the value one, meaning that the function assigns the value one to the first intensity value. The maximum 601 may be located inside the range 514 and not at one of its end points, such as at the upper end point "Imax". This is particularly advantageous if the range 514 is close to the upper end of the intensity scale, since otherwise there is a risk that the intensities in the range 514 saturate upon being redistributed using the function 212. For functions 212c and 212e, the maximum 601 is not achieved for a single first intensity value but for intensity values within a sub-range of the range 514.

Secondly, the functions 212a, 212b, 212c, 212d, 212e decay with increasing distance in intensity from the first intensity value 602. For functions 212a, 212b, 212d the decay is strict, while for functions 212c and 212e the decay is non-strict for a sub-range of intensities.

Thirdly, the functions 212a, 212b, 212c, 212d, 212e assign lower values to intensity values outside of the range 514 than to the first intensity value 602. Functions 212a, 212b, 212d, 212e assign lower values to intensity values outside of the range 514 than to each intensity value within the range. This is however not the case for the function 212d.

The function 212 may generally be varied within the boundaries set by these common characteristics, and many more examples than those shown in FIG. 6 may be considered. To exemplify, the function 212 may be symmetric around the first intensity value 602 (cf. functions 212a, 212b, 212c, 212e), or it may be asymmetric around the first intensity value (cf. function 212d). For example, the function 212 may be skewed around the first intensity value 602. As illustrated by example function 212d, the function 212 may have a heavier tail for higher intensity values than for lower intensity values. This will serve to give more emphasis to higher intensities than to lower intensities. This may be relevant in a situation where the images depict objects which are warmer than the background. In the opposite situation where the objects of interest are colder than the background, such as animals on a hot savannah, the tail may instead be heavier for lower intensities. The function 212 may be continuous (cf. functions 212a, 212b, 212c, 212d) or discontinuous (cf. function 212e). Further, the function 212 may be smooth (such as being differentiable, cf. functions 212a, 212b, 212d) or non-smooth (cf. function 121e).

In order to determine a function 212 which has the common characteristics described above, the redistribution function determiner 206 may use a parametric function. The parametric function may, for example, be a Gaussian function or a skewed Gaussian function. Functions 212a and 212b schematically illustrates Gaussian functions, while function 212d schematically illustrates a skewed Gaussian function. A parametric function is completely defined by a set of parameters. The redistribution function determiner 206 may determine the parameters of the parametric function based on the intensity values of the changed pixels 408, such as based on various properties of the distribution of the changed pixels 408. These properties may include one or more of a mean of the intensity values, a mode of the intensity values, a mid-point of the range of the intensity values, and the variability of the intensity values. For example, the location of the maximum of the function may be determined based on the mean of the intensity values, the mode of the intensity values, or the mid-point of the range of the intensity values. Further, the width of the function (which is inversely related to the rate of decay of the function) may be set depending on the variability of the intensity values of the changed pixels 408, and in some cases also depending on the variability of the non-changed pixels in the current image 103a.

To exemplify, a Gaussian function is of the form:

$$f(x) = ae^{-\frac{(x-b)^2}{2c^2}}.$$

It has three parameters: a gain parameter a, a location parameter b, and a parameter c which governs the width of the curve (and 1/c hence governs the rate of decay of the curve). The gain parameter a may be set to be equal to one, although this is not a necessary requirement.

The Gaussian function has its maximum for x=b. Accordingly, the location parameter b corresponds to the first intensity value 602. The redistribution function determiner 206 may set the location parameter b to be equal to one of a mode of the intensity values of the changed pixels 408 (i.e., the intensity value where the histogram 510 has its maximum), a mean value of the intensity values of the changed pixels 408, and a mid-point of the range 514 (i.e., Imin+(Imax−Imin)/2).

The width of the function, i.e., the parameter c may be set depending on the variation of the intensity values of the changed pixels 408. Generally, the higher the variation of the intensity values, the wider the width of the function. The variation of the intensity values of the changed pixels may be determined from the standard deviation of the intensity values of the changed pixels 408, or from the width of the range 514 of the intensity values of the changed pixels 408. For example, the redistribution function determiner 206 may set the width parameter c as c=d(Imax−Imin), for some factor d. Referring to functions 212a, 212b of FIG. 6, the factor d is set to be larger for function 212b than for function 212a.

The factor d may have a fixed value which is empirically found to be suitable for a certain application. Alternatively, the factor d may be set depending on a variability of the intensities for pixels in the current image 103a which are not identified as changed. For example, the factor d may be proportional to the variability of the intensity values of the non-changed pixels. The variability may again be estimated by calculating a standard deviation or by calculating the width of the range of the concerned intensity values.

According to step S08 in FIG. 3, once the function 212 has been determined, the intensity value redistributor 208 uses the function 212 to redistribute intensity values of pixels in the current image 103a so as to produce an enhanced image of the sequence 105. In other words, the function 212 is used to redistribute intensity values in both the changed pixels 408 and the non-changed pixels. The redistribution of intensity values is applied to a majority of the pixels in the current image 103a, and preferably to all pixels in the current image 103a.

In more detail, the function 212 may be used to calculate a weighting factor for the pixels in the current image 103a. The weighting factor is calculated for a pixel by evaluating the function 212 for the intensity value in the pixel. The enhanced image of the sequence 105 is then determined by multiplying the intensity values in the pixels by their corresponding weighting factors. For example, denoting the intensity value in a pixel by I, and the function 212 by $f$, the intensity value of a pixel in the enhanced image of the sequence 105 is calculated as I·f(I).

Due to the properties of the function 212 described above, the function 212 will generally assign a larger weighting factor to intensity values within the range 514 than to intensity values outside of the range 514. Specifically, a larger weighting factor will be applied to intensity values of the changed pixels corresponding to the first, moving, object 402, than to the intensity values of the background 406. As a result, the contrast between the first object 402 and the background 406 is increased. Notably, also the second object 404 (which, similarly to the first object 402, is a human being) will be given a larger weighting factor than the background 406 since its intensity values typically are within the range 514.

The effect of applying the function 212 is hence that the intensity values in the image are redistributed. In other words, the distribution of the intensity values is changed from a first distribution to a second distribution. This is further exemplified in FIG. 5a and FIG. 5c. FIG. 5a illustrates a histogram 500 of the current image 103a, while FIG. 5c illustrates a histogram 520 of the enhanced image of the sequence 105, i.e., after redistribution of the intensity values in the current image 103a. From FIG. 5c, it is seen that the intensities of the background (corresponding to a peak 521) is shifted towards lower intensities such that they are further separated from the intensities of the objects 402, 404 (corresponding to a peak 522).

In the example above, there was only one type of object in the scene, namely the human beings 402 and 404. Depending on the application, there may be several types of objects in the scene. The different types of objects may be associated with different temperatures and may hence show up as different peaks in the histogram of intensity values. Particularly, there may be several distinct peaks in the histogram associated with the intensity values of the changed pixels. In other words, the histogram may be multi-modal. In such a situation, the different peaks in the histogram may be considered separately from each other. In more detail, a function may be determined for each peak in the histogram in the manner explained above. Each function will thus have a maximum for an intensity within a range associated with one of the peaks, and decay with increasing distance from that distance such that it assigns lower values to intensity values outside of the range than to the intensity for which the maximum is reached. The different peaks may be given different weights in relation to each other. The relation between the weights may, for example, represent a strength ratio between the peaks. The different weights may be implemented by allowing the gain parameter a described above to be different for different peaks. The determined functions may then be merged into a single function, e.g., by taking the maximum of the functions for each intensity value. It is understood that there are other options for merging the plurality of functions into a single function. This includes taking a mean value of the functions for intensity values where they overlap, taking a maximum of the functions for intensity values corresponding to the changed pixels and taking a minimum of the functions for intensity values corresponding to the non-changed pixels. The single function may then be used to redistribute the intensity values of all pixels in the image in accordance with the above.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for enhancing changes in an image of an image sequence captured by a thermal camera, comprising:
   receiving an image which is part of an image sequence captured by a thermal camera,
   identifying, using processing circuitry, pixels in the image that have changed in relation to another image in the image sequence by comparing the image to the other image in the image sequence,
   determining, based on intensity values of the identified pixels, a function for redistributing intensity values of pixels in the image, wherein the function has a maximum for a first intensity value in a range of the intensity values of the identified pixels, and decays with increasing distance from the first intensity value such that the function assigns lower values to intensity values outside of the range than to the first intensity value, and
   redistributing intensity values of pixels in the image that have changed in relation to the other image and intensity values of pixels in the image that have not changed in relation to the other image by using the determined function, thereby enhancing changes in the image.

2. The method of claim 1, wherein a rate of decay of the function is determined based on a variation of the intensity values of the identified pixels, wherein a higher variation gives a lower rate of decay.

3. The method of claim 2, wherein the variation of the intensity values of the identified pixels is determined based on the width of the range of intensity values of the identified pixels.

4. The method of claim 2, wherein the rate of decay of the function is further based on a variation of intensity values of pixels in the image that are not identified as having changed in relation to the other image, wherein a higher variation of intensity values of pixels in the image that are not identified as having changed in relation to the other image gives a lower rate of decay.

5. The method of claim 1, wherein the first intensity value corresponds to a mode of the intensity values of the identified pixels.

6. The method claim 1, wherein the first intensity value corresponds to a mid-point of the range of intensity values of the identified pixels.

7. The method of claim 1, wherein the first intensity value corresponds to a mean value of the intensity values of the identified pixels.

8. The method of claim 1, wherein the function is symmetric around the first intensity value.

9. The method of claim 1, wherein the function is skewed around the first intensity value.

10. The method of claim 9, wherein the function is skewed to have a heavier tail for higher intensity values than for lower intensity values.

11. The method of claim 1, wherein the function is a Gaussian function or a skewed Gaussian function.

12. The method of claim 1, wherein the step of identifying pixels in the image that have changed in relation to another image in the image sequence includes identifying pixels in the image that have an intensity value which differs by more than a threshold value from an intensity value of a corresponding pixel of the other image in the image sequence.

13. A device for enhancing changes in an image of an image sequence captured by a thermal camera, comprising:

a receiver configured to receive an image which is part of an image sequence captured by a thermal camera, and processing circuitry configured to identify pixels in the image that have changed in relation to another image in the image sequence by comparing the image to the other image in the image sequence, determine, based on intensity values of the identified pixels, a function for redistributing intensity values of pixels in the image, wherein the function has a maximum for a first intensity value in a range of the intensity values of the identified pixels, and decays with increasing distance from the first intensity value such that the function assigns lower values to intensity values outside of the range than to the first intensity value, and redistribute intensity values of pixels in the image that have changed in relation to the other image and intensity values of pixels in the image that have not changed in relation to the other image by using the determined function, thereby enhancing changes in the image.

14. A system for enhancing changes in an image of an image sequence captured by a thermal camera, comprising:

a thermal camera configured to capture an image sequence, and a device according to claim 13 arranged to receive images of the image sequence captured by the thermal camera.

15. A non-transitory computer readable medium including executable instructions, which when executed by a computer cause the computer to execute a method for enhancing changes in an image of an image sequence captured by a thermal camera, the method comprising:

receiving an image which is part of an image sequence captured by a thermal camera, identifying pixels in the image that have changed in relation to another image in the image sequence by comparing the image to the other image in the image sequence, determining, based on intensity values of the identified pixels, a function for redistributing intensity values of pixels in the image, wherein the function has a maximum for a first intensity value in a range of the intensity values of the identified pixels, and decays with increasing distance from the first intensity value such that the function assigns lower values to intensity values outside of the range than to the first intensity value, and redistributing intensity values of pixels in the image that have changed in relation to the other image and intensity values of pixels in the image that have not changed in relation to the other image by using the determined function, thereby enhancing changes in the image.

\* \* \* \* \*